Dec. 26, 1967
L. M. HODGEN
3,359,685
DIMENSION COMPENSATING BEARING FOR
AN AUTOMOBILE VENT WINDOW
Filed July 6, 1965
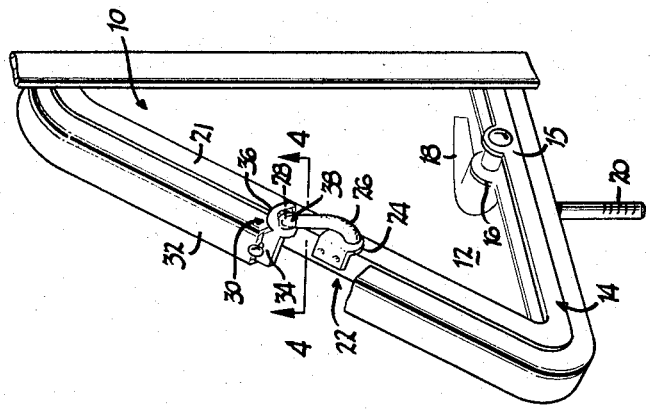
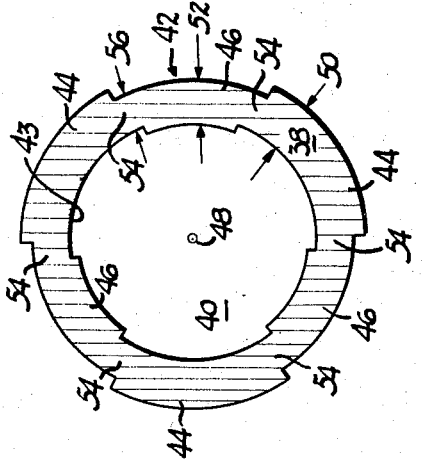
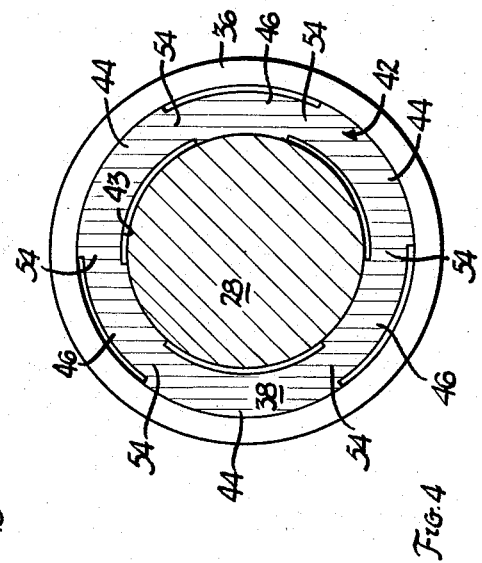
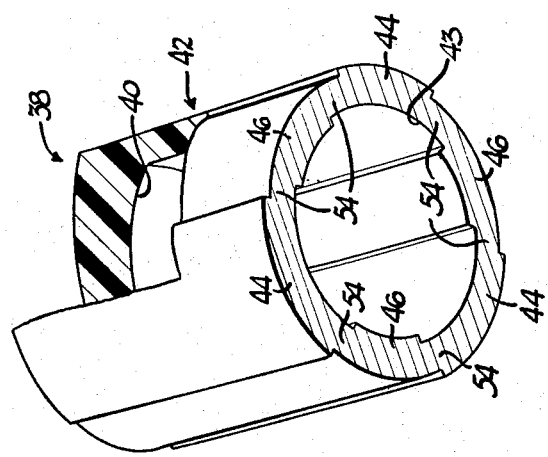
*Inventor.*
LORAN M. HODGEN
BY
Wilson, Settle, Batchelder
Att'ys.    & Craig

United States Patent Office 3,359,685
Patented Dec. 26, 1967

3,359,685
DIMENSION COMPENSATING BEARING FOR AN AUTOMOBILE VENT WINDOW
Loran M. Hodgen, Elkhart, Ind., assignor to Excel Corporation, Elkhart, Ind., a corporation of Indiana
Filed July 6, 1965, Ser. No. 469,595
3 Claims. (Cl. 49—391)

ABSTRACT OF THE DISCLOSURE

The bearing comprises an internal polymeric sleeve capped at one end, preferably made of "Polyallomer" or like plastic. The sleeve per se is an integral cylinder, formed in cross-section as a series of alternately disposed, integrally connected inner and outer arcuate segments, the outer arcuate segments being radially spaced a predetermined distance from the longitudinal centerline axis of the sleeve and the inner arcuate segments being similarly spaced a somewhat lesser distance. The respective arcuate segments extend generally along the length of the sleeve, preferably parallel to the sleeve centerline axis, although a helical or other orientation could be used. The inner as well as the outer arcuate segments preferably have approximately the same radial thickness. A transition segment of lesser radial thickness than the arcuate segments integrally connects each adjacent inner and outer arcuate segments.

BACKGROUND OF THE INVENTION

Prior known proposals to compensate for dimensional differences between the pivot pin and the pivot socket at the pivot hinge of automobile vent windows have not fully succeeded in satisfactorily silencing travel noises caused by the pin rattling in the socket. Such dimension compensating bearings have not been sufficiently easy to fabricate and install and have not demonstrated a satisfactory useful life expectancy.

The present invention substantially overcomes the foregoing problems. A novel dimension compensating sleeve bearing capped at one end to form a blind-bore and a corresponding method are used to completely silence rattling noises between the pivot pin and the pivot socket of automobile vent windows. The bearings of this invention are easily fabricated and installed and have an expected useful life equivalent to that of the automobile upon which they are used.

The bearing is manipulatively interposed between the pivot pin and the pivot socket of the automobile vent window, the pin initially contacts and presses against the interior surface of the inner arcuate segments and the socket initially contacts and presses against the exterior surface of the outer arcuate segments. The sleeve is, thus, compressed somewhat between the pin and the socket. This slight compression is achieved by essentially unitarily displacing each outer arcuate segment radially inwardly by reason of compressive engagement with the socket and each inner arcuate segment radially outwardly by reason of compressive engagement with the pin, with the transition segments taking up the distortion induced by the displacement. This results in a rattle-free pivot assembly while allowing relatively free pivotal movement of the pin within the socket against the dimension compensating sleeve for opening and closing the vent window. Hence, the interior surface of the inner arcuate segments is in pressurized engagement with the pin and the exterior surface of the outer arcuate segments is in pressurized engagement with the socket.

Accordingly, it is a primary object of this invention to provide a novel system including a method and a unique dimension compensating bearing interposable between the pivot pin and the pivot socket of an automobile vent window to damp travel vibration noise and the like.

Another object of this invention is the provision of a novel dimension compensating sleeve bearing capped at one end, which bearing is positioned between the pivot pin and the pivot socket of an automobile vent window.

An additional object of this invention is the provision of a novel automobile vent window dimension compensating bearing providing, in cross section, alternately disposed inner and outer arcuate segments integrally connected by transitional segments, the exterior surface of the outer arcuate segments and the interior surface of the inner arcuate segments being pressurizingly engaged respectively with the pivot socket and the pivot pin of the vent window to damp vibration noises.

A further and no less important object of the present invention is the provision of a novel method of damping automobile vent window vibration noises originating at the pivot pin-pivot socket assembly by novelly disposing a dimension compensating bearing of unique cross section between the pin and the socket.

These and other objects and features of the present invention will become more fully apparent from the following description and appended claims taken in conjunction with the accompanying drawings wherein:

FIGURE 1 is a perspective view of an automobile vent window equipped with a presently preferred dimension compensating bearing of the present invention;

FIGURE 2 is an enlarged perspective view of the presently preferred dimension compensating bearing of FIGURE 1 in its fabricated, uninstalled configuration;

FIGURE 3 is a bottom end view of the bearing of FIGURE 2 in its fabricated, uninstalled configuration; and FIGURE 4 is an enlarged bottom end view of the bearing taken along line 4—4 of FIGURE 1 illustrating the bearing in its assembled position between the pivot pin and pivot socket of the vent window.

GENERAL

Referring now to the drawings wherein like numerals are used to designate like parts and which depict the presently preferred embodiment of the present invention, FIGURE 1 illustrates in perspective an automobile vent window, generally designated 10. Vent window 10 comprises a glass pane 12 and an angular frame 14 both of conventional construction. Interposed between the angular frame 14 and the glass pane 12 is a piece of weather strip (not shown) or the like and attached to the lower leg 15 of the frame 14, at 16, is a pivotable lock mechanism 18 of standard design. The lower leg 15 of the angular frame 14 also carries a downwardly extending pivot pin 20 for the usual spring bias attachment.

The upwardly extending leg 21 of the vent window frame 14 carries a pivot hinge, generally designated 22, which is integrally secured to the frame leg 21 by means of countersunk screws, rivets or the like. The pivot hinge 22 comprises a base 24 and an integral, upwardly projecting pivot pin 26. The distal end 28 of the pivot pin 26 forms the male portion of the pivot pin-pivot socket assembly, generally designated 30. The female socket portion of the assembly 30 is designated 36 and is integrally joined to a support base 34. The support base 34 in turn is rigidly fastened by screws, rivets or the like to a fixed metal strip 32 which is carried by the automobile door. Fitted over the pin end 28 so as to be interposed between the socket 36 and the pin end 28 is a novel dimension compensating sleeve bearing, generally designated 38, which surprisingly quiets automobile vent window rattling and like travel noises at the pivot pin-pivot socket assembly 30. Also the bearing is easy to fabricate, has a long useful life and retains its structural integrity and dimensional stability even after a significant period of use.

THE DIMENSION COMPENSATING BEARING

FIGURES 2, 3 and 4 variously illustrate the novel bearing 38 of this invention, FIGURES 2 and 3 illustrating the bearing 38 in its fabricated but uninstalled configuration and FIGURE 4 illustrating the bearing 38 in its installed, somewhat deformed orientation, as taken along line 4—4 of FIGURE 1.

The bearing 38, preferably made of polymeric material such as "Polyallomer" plastic or the like having durable, low friction features, is integrally fabricated as a blind-bore having an end cap 40 at one end and a generally cylindrical sleeve 42, providing an opening 43 for placement upon the pin end 28.

In cross section, with reference to FIGURES 2 and 3, the cylindrical sleeve portion 42 comprises alternately disposed outer arcuate segments 44 and inner arcuate segments 46. As can be appreciated by inspection of FIGURE 3, each segment 44 constitutes an arcuate segment which is radially disposed a predetermined distance from the longitudinal centerline 48 of the sleeve 42. Each segment 46 also constitutes an arcuate segment radially disposed with respect to the longitudinal centerline 48 of the sleeve 42, but spaced from the centerline by a somewhat shorter distance. The outer arcuate segments 44 each have a radial thickness designated 50 which is equal to the radial thickness 52 of each of the inner arcuate segments 46.

With further reference to FIGURE 3, an arcuate transition segment 54 is interposed between each adjacent outer and inner arcuate segments 44 and 46. Each transitional segment 54 has a radial thickness designated 56 which is less than either radial thickness 50 or 52, previously described.

INSTALLATION OF THE BEARING

With specific reference to FIGURE 4, the bearing 38, as illustrated and previously described with reference to FIGURES 1, 2 and 3, is novelly utilized as a means for damping vibration noises created by travel rattling of the pivot pin-pivot socket assembly 30 of the automobile vent window 10, when interpositioned between the socket 36 and the distal end 28 of the pivot pin 26. Assemblying is achieved by fitting the bearing 38 at sleeve opening 43 over the distal pin end 28 and thereafter fitting the socket 36 over the top of the bearing 38. Thus, the exterior surface of the outer arcuate segments 44 are initially brought into surface contact with the socket 36 and the interior surface of the inner arcuate segments 46 are initially brought into contact with the distal pin end 28.

Assemblage of the bearing 38 between the socket 36 and the pivot pin distal end 28 essentially results in some compression of the bearing sleeve 42 by reason of the outer arcuate segments 44 being displaced unitarily by pressure contact with the socket 36 generally radially inwardly toward the longitudinal sleeve centerline 48 and the inner arcuate segments 46 being displaced unitarily by pressure contact with the pin end 28 generally radially outward away from the sleeve centerline axis 48. This displacement results in a slight distortion of the arcuate transition segments 54 since they are of lesser radial thickness, as depicted in FIGURE 4.

Thus, the sleeve 42 of the bearing 38 is in pressurized frictional engagement between the socket 36 and the pin distal end 28 of silence travel-rattling while accommodating ready pivotal movement of the pin end 28 within the socket 36.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a pivot pin and socket assembly of an automobile vent window, a dimension compensating bearing interposed between the pin and the socket to damp rattling and the like, said bearing comprising a polymeric sleeve fabricated into a cross sectional configuration of outer arcuate segments extending along the length of the sleeve and integrally interposed between inner arcuate segments which extend generally parallel to said outer arcuate segments, said outer and inner arcuate segments being of essentially the same thickness, and transitional segments of a lesser thickness interposed between each outer and inner arcuate segment, said outer arcuate segments being displaced inwardly and said inner arcuate segments being displaced outwardly to frictionally retain the pin, socket and bearing assembly in rattle-free pivotable relation.

2. In an automobile vent window and the like, a dimension compensating bearing interposable between a pivot pin and a pivot socket to silence vibration noise, said dimension compensating bearing comprising a polymeric integral sleeve having in cross section outer generally arcuate segments of a first essentially radial average diameter serially interposed between inner generally arcuate segments of a second smaller essentially radial average diameter, said outer arcuate segments and said inner arcuate segments being of essentially the same radial thickness, each said outer arcuate segment being connected to the adjacent inner arcuate segment by a transition segment of lesser thickness, said sleeve when interposed between said pivot pin and said pivot socket being displaced to compensate for dimensional differences between the pin and the socket so that said outer arcuate segments are inwardly displaced essentially radially of the sleeve and said inner arcuate segments are outwardly displaced essentially radially of the sleeve, said transition segments being deformable to accommodate said displacements.

3. In an automobile vent window and the like, a dimension compensating bearing interposable between a pivot pin and a pivot socket to silence vibration noise, said dimension compensating bearing comprising a polymeric sleeve having in cross-section outer segments of a first average radius serially interposed between inner segments having a second smaller average radius, and transitional segments having a third average radius intermediate said first and second radii interposed between each outer and inner segment, said sleeve when interposed between said pivot pin and said pivot socket (1) engaging the socket at the exterior surface of the outer segments to inwardly displace said outer segments essentially radially of the sleeve and (2) engaging the pin at the interior surface of the inner segments to outwardly displace said inner segments.

References Cited

UNITED STATES PATENTS

| 2,698,958 | 1/1955 | Adams | 16—140 |
| 2,897,026 | 7/1959 | Haller et al. | 308—238 |
| 3,065,035 | 11/1962 | Biesecker | 308—238 X |
| 3,096,128 | 7/1963 | Wight | 308 |

FOREIGN PATENTS

| 1,310,614 | 10/1962 | France. | |

KENNETH DOWNEY, *Primary Examiner.*